(12) United States Patent
Fujitake

(10) Patent No.: US 9,093,724 B2
(45) Date of Patent: Jul. 28, 2015

(54) VEHICLE AND METHOD OF CHARGING VEHICLE

(75) Inventor: Yoshinori Fujitake, Nishikamo-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 558 days.

(21) Appl. No.: 12/670,015

(22) PCT Filed: Sep. 5, 2008

(86) PCT No.: PCT/JP2008/066036
§ 371 (c)(1),
(2), (4) Date: Jan. 21, 2010

(87) PCT Pub. No.: WO2009/034918
PCT Pub. Date: Mar. 19, 2009

(65) Prior Publication Data
US 2010/0198440 A1    Aug. 5, 2010

(30) Foreign Application Priority Data
Sep. 10, 2007 (JP) ................................ 2007-234333

(51) Int. Cl.
*B60L 9/00* (2006.01)
*H01M 10/44* (2006.01)
(Continued)

(52) U.S. Cl.
CPC ........... *H01M 10/44* (2013.01); *B60L 11/1816* (2013.01); *B60L 11/1848* (2013.01);
(Continued)

(58) Field of Classification Search
CPC ........... Y02T 10/7005; Y02T 10/6286; B60W 20/00; B60W 10/08; B60W 10/06; B60W 2510/244
USPC ............................................ 701/22; 320/165
See application file for complete search history.

(56) References Cited

U.S. PATENT DOCUMENTS 4,944,281 A * 7/1990 Suquet .......................... 123/644
5,397,991 A * 3/1995 Rogers .......................... 320/125
(Continued)

FOREIGN PATENT DOCUMENTS

JP    A-02-146937    6/1990
JP    A-06-121408    4/1994
(Continued)

OTHER PUBLICATIONS

Japan Electric Vehicle Association Standard, "Electric Vehicle Conductive Charging System: General Requirements," Mar. 29, 2001 (With Translation).
(Continued)

*Primary Examiner* — Behrang Badii
*Assistant Examiner* — Daniel L Greene
(74) *Attorney, Agent, or Firm* — Oliff PLC

(57) ABSTRACT

An electronic Control Unit (ECU) executes a program including a step of calculating a first charging current value in accordance with the state of a battery pack; a step of calculating a second charging current value in accordance with the current capacity of a charging cable coupling a hybrid vehicle and an external power supply to output a pilot signal CPLT indicating the current capacity; a step of setting the smaller one of the first charging current value and the second charging current value as a third charging current value; and a step of controlling a charger such that the output current value of the charger connected to the charging cable for controlling a value of a current supplied to the battery pack is equal to the third charging current value, for charging the battery pack.

27 Claims, 10 Drawing Sheets

(51) Int. Cl.
  *B60L 11/18* (2006.01)
  *H02J 7/00* (2006.01)
  *H01M 16/00* (2006.01)

(52) U.S. Cl.
  CPC ......... *B60L11/1861* (2013.01); *B60L 11/1872* (2013.01); *B60L 11/1881* (2013.01); *H02J 7/0055* (2013.01); *B60L 11/1844* (2013.01); *H01M 16/00* (2013.01); *Y02E 60/721* (2013.01); *Y02T 10/705* (2013.01); *Y02T 10/7044* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 10/126* (2013.01); *Y04S 30/14* (2013.01)

(56) References Cited

U.S. PATENT DOCUMENTS

| | | | | |
|---|---|---|---|---|
| 5,462,439 | A * | 10/1995 | Keith | 320/109 |
| 5,589,757 | A * | 12/1996 | Klang | 320/160 |
| 5,600,550 | A * | 2/1997 | Cook, II | 363/50 |
| 6,791,295 | B1 * | 9/2004 | Berels | 320/103 |
| 6,833,683 | B2 * | 12/2004 | Winkler | 320/109 |
| 7,129,598 | B2 * | 10/2006 | Wagner et al. | 307/10.7 |
| 7,455,134 | B2 * | 11/2008 | Severinsky et al. | 180/65.28 |
| 7,474,079 | B2 * | 1/2009 | Hashimoto | 320/138 |
| 7,632,583 | B2 * | 12/2009 | Pearson | 429/532 |
| 7,746,036 | B2 * | 6/2010 | Wolf et al. | 320/162 |
| 2006/0125449 | A1 * | 6/2006 | Unger | 320/141 |
| 2008/0169705 | A1 * | 7/2008 | Tan et al. | 307/66 |

FOREIGN PATENT DOCUMENTS

| | | |
|---|---|---|
| JP | A-06-269130 | 9/1994 |
| JP | A-07-298506 | 11/1995 |
| JP | A-10-150729 | 6/1998 |
| JP | A-10-285819 | 10/1998 |
| JP | A-2001-112181 | 4/2001 |
| WO | WO 94/08381 | 4/1994 |
| WO | WO 2006/080900 A1 | 8/2006 |

OTHER PUBLICATIONS

SAE Standards, "SAE Electric Vehicle Conductive Charge Coupler," *SAE International*, Nov. 2001.
International Search Report issued in International Application No. PCT/JP2008/066036; Mailed on Nov. 11, 2008.

* cited by examiner

F I G. 7
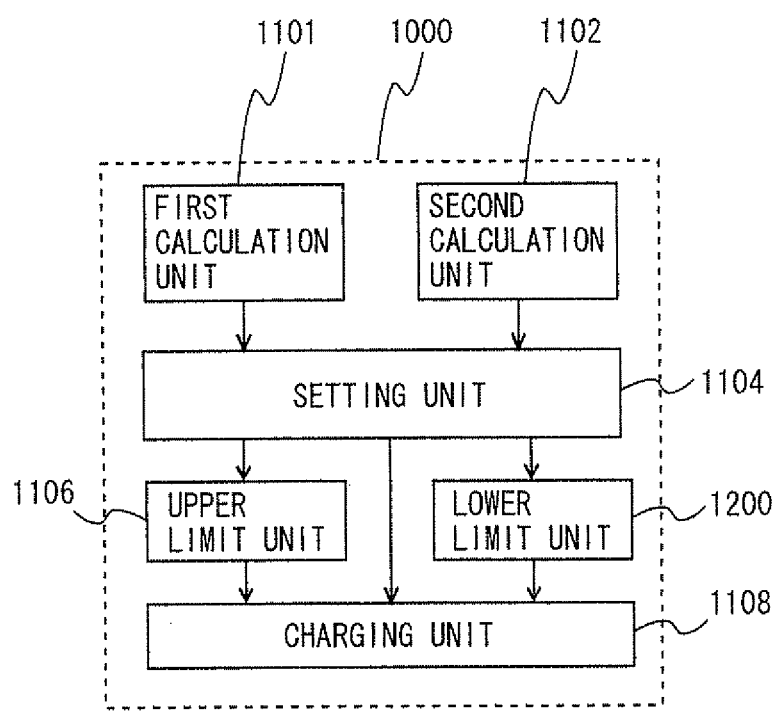

VEHICLE AND METHOD OF CHARGING VEHICLE

TECHNICAL FIELD

The present invention relates a vehicle and a method of charging the vehicle, and particularly to a technique for supplying electric power from an external power supply to a power storage mechanism mounted in the vehicle for charging.

BACKGROUND ART

Conventionally, a vehicle such as a hybrid vehicle, an electric vehicle and a fuel-cell vehicle using an electric motor as a driving source has been known. Such a vehicle is provided with a power storage mechanism such as a battery for storing electric power supplied to the electric motor. The electric power generated during regenerative braking or generated by a power generator mounted in the vehicle is stored in the battery.

There are also some vehicles in which electric power is supplied from a power supply external to the vehicle such as a household power supply to the battery mounted in the vehicle for charging the battery. The outlet disposed on the house is coupled to the connector provided on the vehicle via a cable to supply electric power from the household power supply to the battery of the vehicle. The vehicle having a battery mounted therein and charged by the power supply provided external to the vehicle is hereinafter also referred to as a plug-in vehicle.

The standards of the plug-in vehicle are defined in "Electric Vehicle Conductive Charging System General Requirements" (Non-Patent Document 1) in Japan and in "SAE Electric Vehicle Conductive Charge Coupler" (Non-Patent Document 2) in the United States.

By way of example, "Electric Vehicle Conductive Charging System General Requirements" and "SAE Electric Vehicle Conductive Charge Coupler" define the standards regarding a control pilot. The control pilot has a function of transmitting a square wave signal (hereinafter also referred to as a pilot signal) from an oscillator to a control pilot line, to thereby indicate to the vehicle that an EVSE (Electric Vehicle Supply Equipment) can supply energy (electric power). The EVSE is an apparatus for connecting an external power supply to the vehicle. For example, when the plug of the EVSE is connected to the power supply external to the vehicle and the connector of the EVSE is connected to the connector provided on the vehicle, a pilot signal is output. In accordance with the pulse width of the pilot signal, the plug-in vehicle is notified of the capacity of the current that can be supplied. When the pilot signal is detected, the plug-in vehicle prepares to start the charging operation (closing the relay, and the like).

The general power supply voltage for household use is 100V in Japan. However, the power supply voltage may be 200V, for example, in industrial facilities. Furthermore, the plug-in vehicle is also used in countries other than Japan. In the countries other than Japan, the power supply voltage for household use may be a voltage other than 100V. Accordingly, it is desirable that power supplies of various standards can be applied for charging of the plug-in vehicle.

Japanese Patent Laying-Open No. 10-285819 (Patent Document 1) discloses a charging apparatus including a voltage converting unit converting the voltage of the input electric power input from the outside to generate a direct-current (DC) electric power of a desired voltage and supplying the generated DC electric power to a battery; a voltage characteristic setting unit setting, for the voltage converting unit, a voltage characteristic in which the DC electric power supplied to the battery is less than or equal to a given maximum value; and a maximum value assigning unit receiving an instruction from the outside and, in response to the instruction, assigning a predetermined maximum value to the voltage characteristic setting unit.

According to the charging apparatus disclosed in this document, the maximum value of the charging electric power supplied to the battery is set to a predetermined value in accordance with the instruction given from the outside. Accordingly, the upper limit of the input electric power that is input for charging can be set to a desired value.

Patent Document 1: Japanese Patent Laying-Open No. 10-285819

Non-Patent Document 1: "Electric Vehicle Conductive Charging System General Requirements", Japan Electric Vehicle Association Standards (Japan Electric Vehicle Standard), Mar. 29, 2001

Non-Patent Document 2: "SAE Electric Vehicle Conductive Charge Coupler" (the United States), SAE Standards, SAE International, November 2001

DISCLOSURE OF THE INVENTION

Problems to Be Solved by the Invention

Neither "Electric Vehicle Conductive Charging System General Requirements" nor "SAE Electric Vehicle Conductive Charge Coupler" discloses how to accommodate power supplies of various standards. Also in Japanese Patent Laying-Open No. 10-285819, the allowable current and the like for the apparatus (EVSE and the like) connecting the external power supply to the vehicle are not taken into consideration. Therefore, there is a need for further improvement for normally charging the power storage mechanism mounted in the vehicle.

An object of the present invention is to provide a vehicle in which a power storage mechanism can be normally charged and a method of charging the vehicle.

Means for Solving the Problems

A vehicle according to an aspect has a power storage mechanism storing electric power supplied from an external power supply through a coupling unit that outputs a signal indicating a value of a current which can be supplied. This vehicle includes a charger that is connected to the coupling unit and controls a value of a current supplied to the power storage mechanism, and a control unit. The control unit calculates a first charging current value in accordance with a state of the power storage mechanism, calculates a second charging current value in accordance with the value of the current which can be supplied by the coupling unit, sets a smaller one of the first charging current value and the second charging current value as a third charging current value, and controls the charger such that a value of a current supplied from the charger to the power storage mechanism is equal to the third charging current value.

According to this configuration, the coupling unit outputs a signal indicating the value of the current that can be supplied. The power storage mechanism stores the electric power supplied from the external power supply through the coupling unit. The value of the current supplied to the power storage mechanism is controlled by the charger to which the coupling unit is connected. The smaller one of the first charging current value calculated in accordance with the state of the power storage mechanism and the second charging current value calculated in accordance with the value of the current that can be supplied by the coupling unit is set as a third charging current value. The charger is controlled such that the value of the current supplied from the charger to the power storage mechanism is equal to the third charging current value. Consequently, in consideration of the value of the current that can be supplied by the coupling unit along with the state of the power storage mechanism, it becomes possible to control the output electric power value of the charger having the coupling unit connected thereto. Accordingly, the value of the current supplied through the coupling unit can be prevented from exceeding the capacity of the coupling unit. Furthermore, in the case where the current that can be supplied by the external power supply is limited by the breaker and the like, the breaker can be prevented from tripping. As a result, the power storage mechanism can be normally charged.

Preferably, the control unit limits the third charging current value to a threshold value or less.

According to this configuration, the third charging current value, that is, the output current value of the charger, is limited to a threshold value or less. This allows the electric power supplied from the power supply to fall within the range of the capacity of the power supply.

Further preferably, the control unit limits the third charging current value to a threshold value or more.

According to this configuration, the third charging current value, that is, the output current value of the charger, is limited to a threshold value or more, Consequently, for example, the value of the current supplied through the coupling unit to the charger can be set to "0A" or more, with the result that the power storage mechanism can be prevented from being accidentally discharged.

Further preferably, the control unit corrects the third charging current value.

According to this configuration, the third charging current value is corrected, This allows the output current value of the charger to be precisely set.

Further preferably, the control unit corrects the third charging current value to be decreased.

According to this configuration, the third charging current value is corrected to be decreased. Consequently, the output current value of the charger can be prevented from being excessively increased.

Further preferably, in a case where a value of a current supplied from the power supply is greater than the value of the current which can be supplied by the coupling unit, the control unit corrects the third charging current value to be decreased.

According to this configuration, in the case where the value of the current supplied from the power supply is greater than the value of the current which can be supplied by the coupling unit, the third charging current value is decreased. This allows the output current value of the charger to be decreased. Accordingly, the value of the current supplied through the coupling unit can be prevented from exceeding the capacity of the coupling unit, with the result that the power storage mechanism can be normally charged.

Further preferably, the vehicle further includes a voltage sensor that detects a voltage of the power supply within the vehicle. In a case where the detected voltage is less than a predetermined voltage, the control unit corrects the third charging current value to be decreased.

According to this configuration, in the case where the voltage of the power supply detected within the vehicle is less than the predetermined voltage, it can be said that there may be some fault. Thus, the third charging current value, that is, the output current value of the charger is decreased, which allows reduction of damage to the system of the vehicle.

Further preferably, in a case where a correction amount of the third charging current value is greater than a threshold value, the control unit stops charging the power storage mechanism.

According to this configuration, in the case where the correction amount of the third charging current value is greater than the threshold value, the charging is stopped. Accordingly, for example, since the correction amount of the third charging current value is greater than the initial value of the third charging current value, the third charging current value may be a negative value, that is, the charging of the power storage mechanism cannot be continued. In this case, the charging can be stopped.

Further preferably, the control unit corrects the third charging current value to be increased.

According to this configuration, the third charging current value is corrected to be increased. Accordingly, in the case where the output current value of the charger is relatively small, the current value can be increased.

Further preferably, in a case where a value of a current supplied from the power supply is less than the value of the current which can be supplied by the coupling unit, the control unit corrects the third charging current value to be increased.

According to this configuration, in the case where the value of the current supplied from the power supply is less than the value of the current which can be supplied by the coupling unit, the third charging current value is increased. Accordingly, in the case where the value of the current supplied from the power supply is less than the value of the current which can be supplied by the coupling unit, the value of the current can be increased. Consequently, the capacity of the coupling unit can be fully utilized.

BRIEF DESCRIPTION OF THE DRAWINGS

FIG. 7 is a functional block diagram of the ECU according to a second embodiment of the present invention.

BEST MODES FOR CARRYING OUT THE INVENTION

Figure 1:
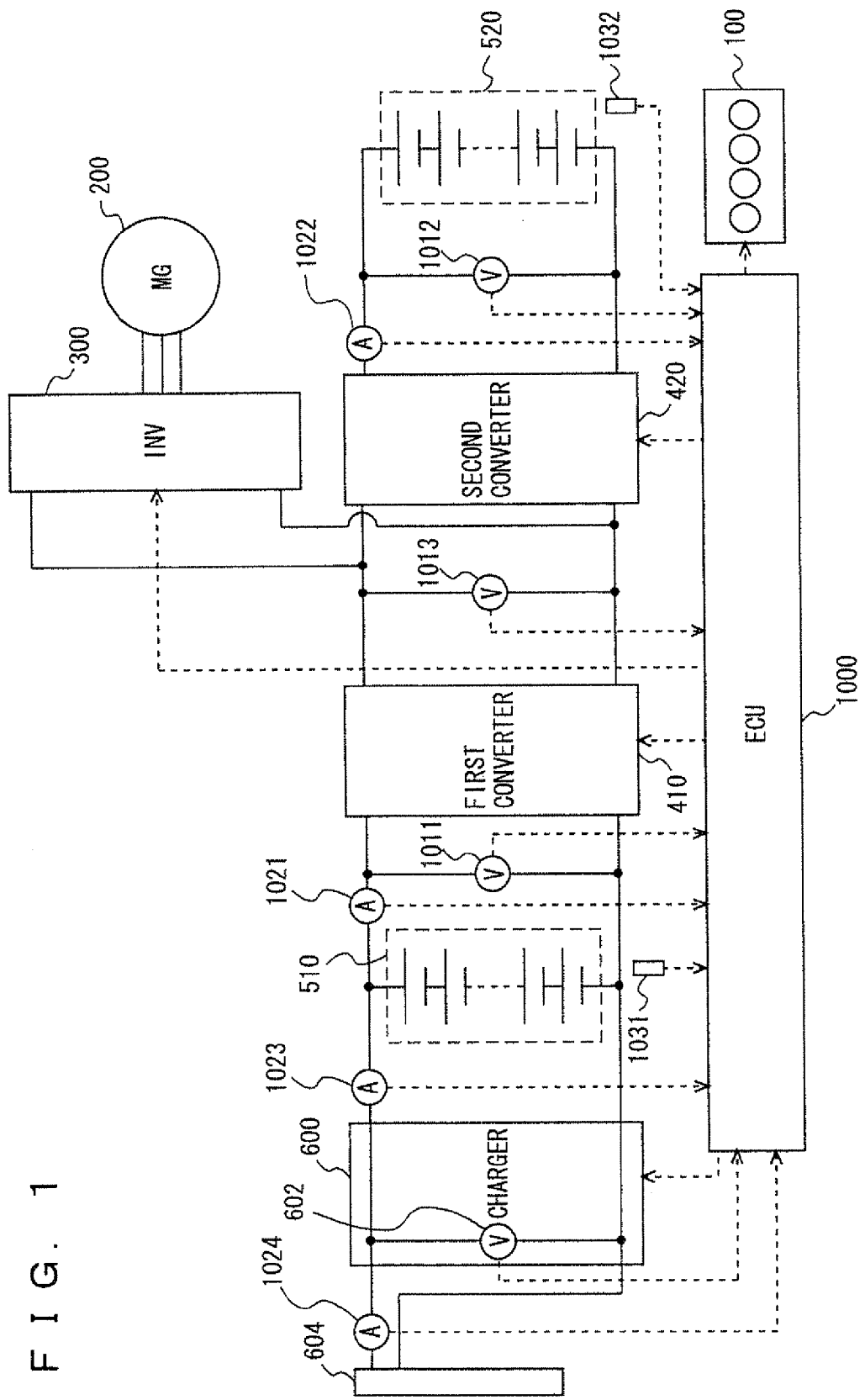
FIG. 1 is a diagram of an electrical system of a hybrid vehicle.

The embodiments of the present invention will be hereinafter described with reference to the accompanying drawings, in which the same components are designated by the same reference characters. Names and functions thereof are the same, and therefore, description thereof will not be repeated.

First Embodiment

Referring to FIG. 1, the hybrid vehicle corresponding to a vehicle according to the first embodiment of the present invention will be hereinafter described. This hybrid vehicle has an engine 100, an MG (Motor Generator) 200, an inverter 300, a first converter 410, a second converter 420, a first battery pack 510, a second battery pack 520, a charger 600, and an ECU (Electronic Control Unit) 1000. It is to be noted that ECU 1100 may be divided into a plurality of ECUs. The hybrid vehicle runs by driving force from at least one of engine 100 and MG 200. In place of the hybrid vehicle, an electric vehicle, a fuel-cell vehicle and the like which run only by the driving force of MG 200 may be applied.

MG 200 serves as a three-phase alternating-current (AC) motor. MG 200 carries out a drive operation by the electric power stored in first battery pack 510 and second battery pack 520. The electric power converted from a direct current into an alternating current by inverter 300 is supplied to MG 200.

The driving force of MG 200 is transmitted to wheels. This causes MG 200 to assist engine 100 or the vehicle to run by the driving force from MG 200. On the other hand, during regenerative braking of the hybrid vehicle, MG 200 is driven by the wheels to thereby operate MG 200 as a power generator. Accordingly, MG 200 operates as a regenerative brake for converting braking energy into electric power. The electric power generated by MG 200 is converted by inverter 300 from an alternating current into a direct current, and then stored in first battery pack 510 and second battery pack 520.

Each of first battery pack 510 and second battery pack 520 serves as a battery set having a configuration in which a plurality of battery modules each having a plurality of battery cells integrated with each other are connected in series. The discharging voltage from first battery pack 510 and the charging voltage to first battery pack 510 are adjusted by first converter 410. The discharging voltage from second battery pack 520 and the charging voltage to second battery pack 520 are adjusted by second converter 420. First battery pack 510 and second battery pack 520 may have the same or different specifications such as maximum storage amount.

First converter 410 and second converter 420 are connected in parallel, First battery pack 510 is connected to first converter 410. Second battery pack 520 is connected to second converter 420, Accordingly, first battery pack 510 and second battery pack 520 are connected in parallel via first converter 410 and second converter 420. Inverter 300 is connected between first converter 410 and second converter 420.

Charger 600 is connected to the positive terminal and the negative terminal of first battery pack 510. Accordingly, first battery pack 510 and second battery pack 520 are connected in parallel to charger 600. It is to be noted that a capacitor (condenser) may be used in place of a battery. Charger 600 supplies a direct current to the battery pack. In other words, charger 600 converts an alternating current into a direct current. Furthermore, charger 600 boosts the voltage.

When first battery pack 510 and second battery pack 520 are charged, charger 600 supplies electric power to first battery pack 510 and second battery pack 520 from outside the hybrid vehicle. It is to be noted that charger 600 may be located outside the hybrid vehicle.

A voltage sensor 602 is provided within charger 600. The signal indicating the voltage value detected by voltage sensor 602 is transmitted to ECU 1000. The voltage of the external power supply is detected within the hybrid vehicle by voltage sensor 602. Charger 600 is connected to the external power supply through the charging cable connected to a charging connector 604. First battery pack 510 and second battery pack 520 are connected to the external power supply through charger 600.

Engine 100, inverter 300, first converter 410, second converter 420, and charger 600 are controlled by ECU 1000. ECU 1000 receives a signal from each of voltage sensors 1011-1013 and current sensors 1021-1024.

Voltage sensor 1011 detects a voltage value of first battery pack 510. Voltage sensor 1012 detects a voltage value of second battery pack 520, Voltage sensor 1013 detects a system voltage value (a voltage value in the area between first converter 410 and second converter 420).

Current sensor 1021 detects a value of the current discharged from first battery pack 510 and a value of the current supplied to first battery pack 510. Current sensor 1022 detects a value of the current discharged from second battery pack 520 and a value of the current supplied to second battery pack 520. Current sensor 1023 detects a value of the current supplied from charger 600 to each of first battery pack 510 and second battery pack 520. Current sensor 1024 detects a value of the current (a value of the alternating current) supplied from the external power supply of the hybrid vehicle through charging cable 700.

ECU 1000 further receives a signal indicating the temperature of first battery pack 510 from a temperature sensor 1031 and a signal indicating the temperature of second battery pack 520 from a temperature sensor 1032.

ECU 1000 calculates the state of charge (SOC) of each of first battery pack 510 and second battery pack 520 based on the values of the voltage, the current and the like input from these sensors. Since the SOC may be calculated using a well-known general technique, detailed description thereof will not be repeated.

Figure 2:
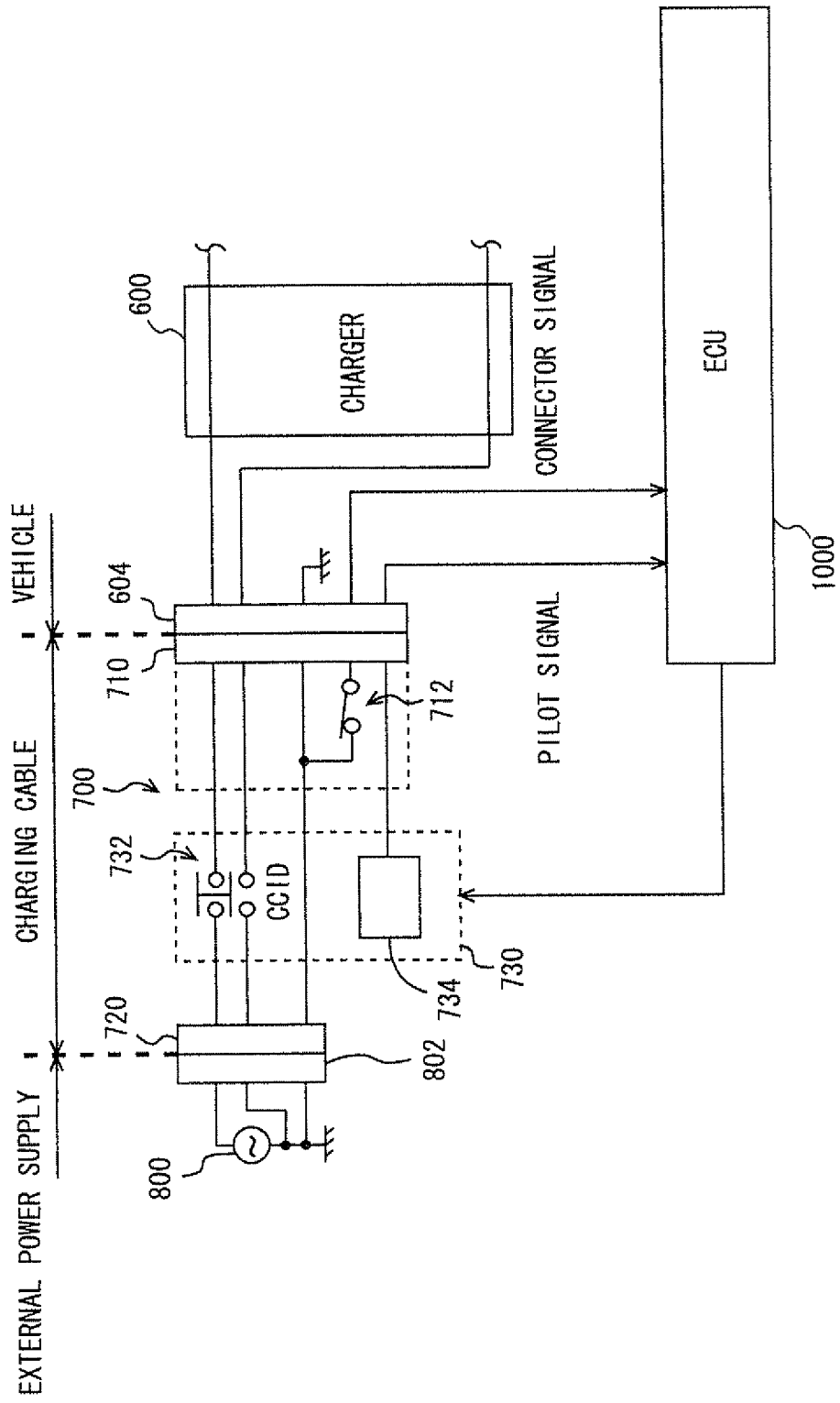
FIG. 2 is a diagram of a charging cable.

Referring to FIG. 2, charging cable 700 will then be described, Charging cable 700 includes a connector 710, a plug 720 and a CCID (Charging Circuit Interrupt Device) 730. Charging cable 700 corresponds to an EVSE.

Connector 710 of charging cable 700 is connected to charging connector 604 provided on the hybrid vehicle. Connector 710 is provided with a switch 712. When switch 712 is closed in the state where connector 710 of charging cable 700 is connected to charging connector 604 provided on the hybrid vehicle, ECU 1000 receives a connector signal CNCT indicating that connector 710 of charging cable 700 is connected to charging connector 604 provided on the hybrid vehicle.

Switch 712 opens and closes in coordination with an anchor fitting (not shown) which anchors connector 710 of charging cable 700 to charging connector 604 of the hybrid vehicle. The anchor fitting (not shown) swings by the user pressing the button (not shown) provided on connector 710.

For example, when the operator moves the finger off the button in the state where connector 710 of charging cable 700 is connected to charging connector 604 provided on the hybrid vehicle, the anchor fitting engages with charging connector 604 provided on the hybrid vehicle and switch 712 is closed. When the operator presses the button, the anchor fitting is disengaged from charging connector 604 and switch 712 is opened. It is to be noted that the method of opening and closing switch 712 is not limited thereto.

Plug 720 of charging cable 700 is connected to a outlet 802 provided on the house. The AC electric power is supplied from external power supply 800 of the hybrid vehicle to outlet 802.

CCID 730 includes a relay 732 and a control pilot circuit 734. In the state where relay 732 is opened, the path is interrupted through which the electric power is supplied from external power supply 800 of the hybrid vehicle to the hybrid vehicle. In the state where relay 732 is closed, the electric power can be supplied from external power supply 800 of the hybrid vehicle to the hybrid vehicle. ECU 1000 controls the state of relay 732 in the state where connector 710 of charging cable 700 is connected to charging connector 604 of the hybrid vehicle.

Control pilot circuit 734 transmits a pilot signal (square wave signal) CPLT to a control pilot line in the state where plug 720 of charging cable 700 is connected to outlet 802, that is, external power supply 800, and where connector 710 is connected to charging connector 604 provided on the hybrid vehicle.

The pilot signal is oscillated by an oscillator provided in control pilot circuit 734. The pilot signal is output or stopped with a delay by the time period for which the operation of the oscillator delays.

When plug 720 of charging cable 700 is connected to outlet 802, control pilot circuit 734 may output a constant pilot signal CPLT even if connector 710 is disconnected from charging connector 604 provided on the hybrid vehicle. However, ECU 1000 cannot detect pilot signal CPLT output in the state where connector 710 is disconnected from charging connector 604 provided on the hybrid vehicle.

When plug 720 of charging cable 700 is connected to outlet 802 and connector 710 is connected to charging connector 604 of the hybrid vehicle, control pilot circuit 734 oscillates pilot signal CPLT of a predetermined pulse width (duty cycle).

The hybrid vehicle is notified of the current capacity of charging cable 700 (a value of the current that can be supplied by charging cable 700) in accordance with the pulse width of pilot signal CPLT. The pulse width of pilot signal CPLT is constant independently of the voltage and the current of external power supply 800.

In the case where a different charging cable is used, the pulse width of pilot signal CPLT may vary. In other words, the pulse width of pilot signal CPLT may be set for each type of the charging cables.

In the present embodiment, the electric power supplied from external power supply 800 is supplied to the battery pack in the state where the hybrid vehicle and external power supply 800 are coupled to each other by charging cable 700.

When first battery pack 510 and second battery pack 520 are charged, the SOC of each of first battery pack 510 and second battery pack 520 is reset.

Figure 3:
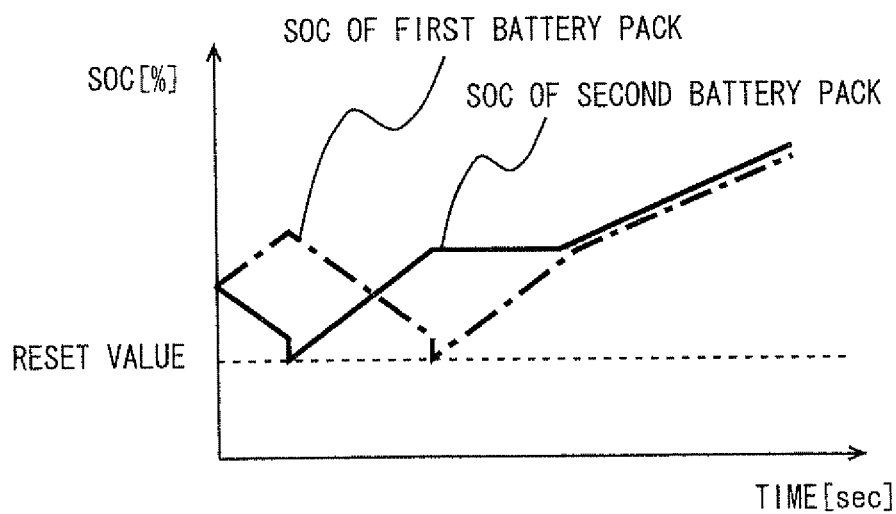
FIG. 3 is a diagram of the state of charge (SOC) of each of a first battery pack and a second battery pack.

As shown in FIG. 3, first battery pack 510 and second battery pack 520 are automatically discharged until the SOC of each of first battery pack 510 and second battery pack 520 is decreased to a reset value. After second battery pack 520 is discharged, first battery pack 510 is discharged.

Figure 4:
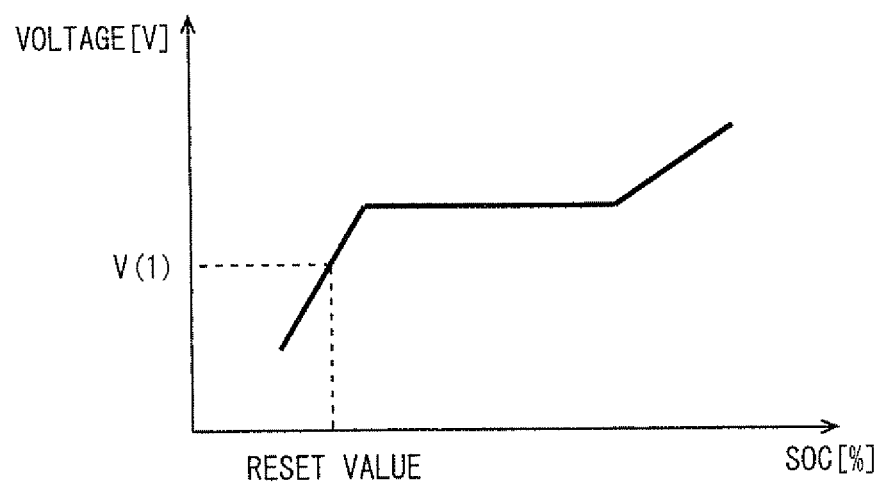
FIG. 4 is a diagram of the relationship between the SOC and the voltage value.

For example, first battery pack 510 and second battery pack 520 are discharged at a constant current value. When the battery pack is discharged at the constant current value, as shown in FIG. 4, the voltage of the battery pack is set in accordance with the SOC. Therefore, when the voltage value of the battery pack is decreased to a threshold value which is set in accordance with the reset value, it is determined that the SOC is decreased to the reset value. When the SOC is decreased to the reset value, the discharge is stopped.

After the SOC is decreased to the reset value, ECU 1000 uses the reset value as an initial value when calculating the SOC of each of first battery pack 510 and second battery pack 520.

As shown in FIG. 3, first battery pack 510 is charged with the electric power discharged from second battery pack 520. After second battery pack 520 is discharged until the SOC of second battery pack 520 is decreased to the reset value, second battery pack 520 is charged with the electric power discharged from first battery pack 510.

For example, as the voltage on the output side of second converter 420 (on the side to which first converter 410 is connected) is set to a voltage higher than that on the output side of first converter 410 (on the side to which second converter 420 is connected), the electric power discharged from second battery pack 520 is supplied to first battery pack 510. In contrast, as the voltage on the output side of first converter 410 is set to a voltage higher than that on the output side of second converter 420, the electric power discharged from first battery pack 510 is supplied to second battery pack 520. It is to be noted that the charging method is not limited thereto.

During discharging of second battery pack 520, the electric power supplied from outside the hybrid vehicle through charging cable 700 and charger 600 is supplied to first battery pack 510. Furthermore, during discharging of first battery pack 510, the electric power supplied from outside the hybrid vehicle through charging cable 700 and charger 600 is supplied to second battery pack 520.

After first battery pack 510 is discharged until the SOC of first battery pack 510 is decreased to the reset value, the electric power supplied from outside the hybrid vehicle through charger 600 is supplied to first battery pack 510 and second battery pack 520.

First battery pack 510 and second battery pack 520 are charged until the SOC ultimately reaches, for example, the maximum value, that is, "100%". It is to be noted that the charging may be carried out until the SOC reaches a value smaller than the maximum value.

Figure 5:
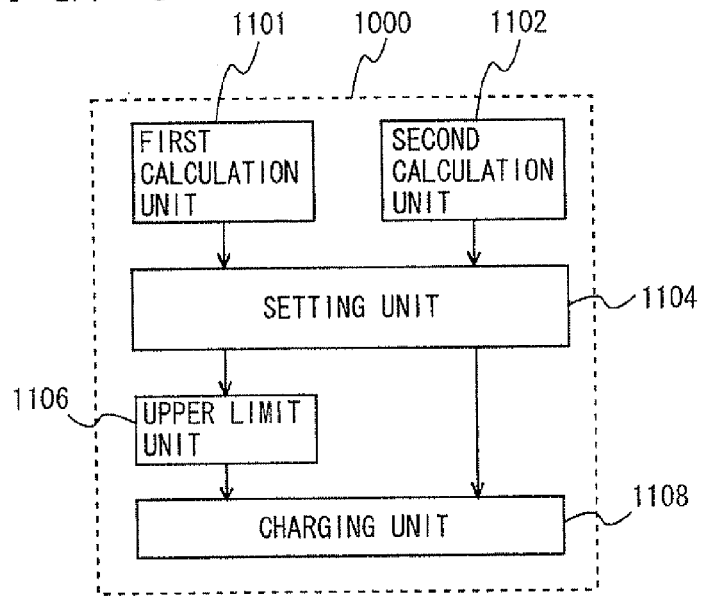
FIG. 5 is a functional block diagram of an ECU according to a first embodiment of the present invention.

Referring to FIG. 5, the functions of ECU 1000 will then be described. It is to be noted that the functions of ECU 1000 described below may be implemented by hardware or software.

ECU 1000 includes a first calculation unit 1101, a second calculation unit 1102, a setting unit 1104, an upper limit unit 1106, and a charging unit 1108.

First calculation unit 1101 calculates the first charging current value in accordance with the state of the battery pack. More specifically, the first charging current value is calculated based on a tolerance value swin_total of the electric power input to the vehicle and the voltage of the battery pack.

Tolerance value swin_total of the electric power input to the vehicle is calculated using the following equation 1.

$$\text{swin\_total} = \text{swin} + \alpha \qquad (1)$$

In equation 1, swin represents a limit value of the charging current which is obtained based on the map including the temperature, the increasing ratio of the temperature, the SOC and the like of the battery pack as parameters. For example, swin is obtained based on the temperature, the increasing ratio of the temperature, the SOC and the like of first battery pack 510 having charger 600 connected thereto. Furthermore, swin may be obtained based on the temperature, the increasing ratio of the temperature, the SOC and the like of second battery pack 520 in place of or in addition to first battery pack 510.

The higher the temperature of the battery pack or the increasing ratio of the temperature thereof is, the smaller the limit value swin is set. Furthermore, the greater the SOC is, the smaller the limit value swin is set. In equation 1, α represents the electric power loss in auxiliary machinery such as charger 600. It is to be noted that the method of calculating tolerance value swin_total of the input electric power is not limited thereto. The first charging current value is calculated using the following equation 2. In equation 2, VB represents the voltage of first battery pack 510, that is, the voltage detected by voltage sensor 1011.

$$\text{First charging current value} = \text{swin\_total}/VB \qquad (2)$$

Second calculation unit 1102 calculates the second charging current value based on the information on charging cable 700 and external power supply 800, More specifically, the second charging current value is calculated based on the current capacity of charging cable 700, the voltage of power supply 800 and the voltage of the battery pack.

As described above, the current capacity of charging cable 700 is obtained from pilot signal CPLT. The voltage of power supply 800 is detected by voltage sensor 602 provided within charger 600. The second charging current value is calculated using the following equation 3. In equation 3, ALT represents the current capacity of charging cable 700, VS represents the voltage of power supply 800, VB represents the voltage of first battery pack 510, that is, the voltage detected by voltage sensor 1011, and β represents the efficiency of charger 600.

$$\text{Second charging current value} = \text{ALT} \times VS \times \beta / VB \qquad (3)$$

Setting unit 1104 sets the smaller one of the first charging current value and the second charging current value as a third charging current value.

Upper limit unit 1106 limits the third charging current value to a predetermined upper limit value or less. In other words, in the case where the third charging current value set by setting unit 1104 is greater than or equal to the upper limit value, the upper limit value is set as the third charging current value.

In the case where the voltage of power supply 800 is 100V, the upper limit value is set to approximately 5A, for example. In the case where the voltage of power supply 800 is 200V, the upper limit value is set to approximately 10A. It is to be noted that the upper limit value is not limited thereto.

Charging unit 1108 controls charger 600 such that the output current value of charger 600 is equal to the set third charging current value, for charging the battery pack.

The first charging current value, the second charging current value and the third charging current value are calculated each time the battery pack is charged. Furthermore, during charging of the battery pack, the first charging current value, the second charging current value and the third charging current value are sequentially calculated and updated.

Figure 6:
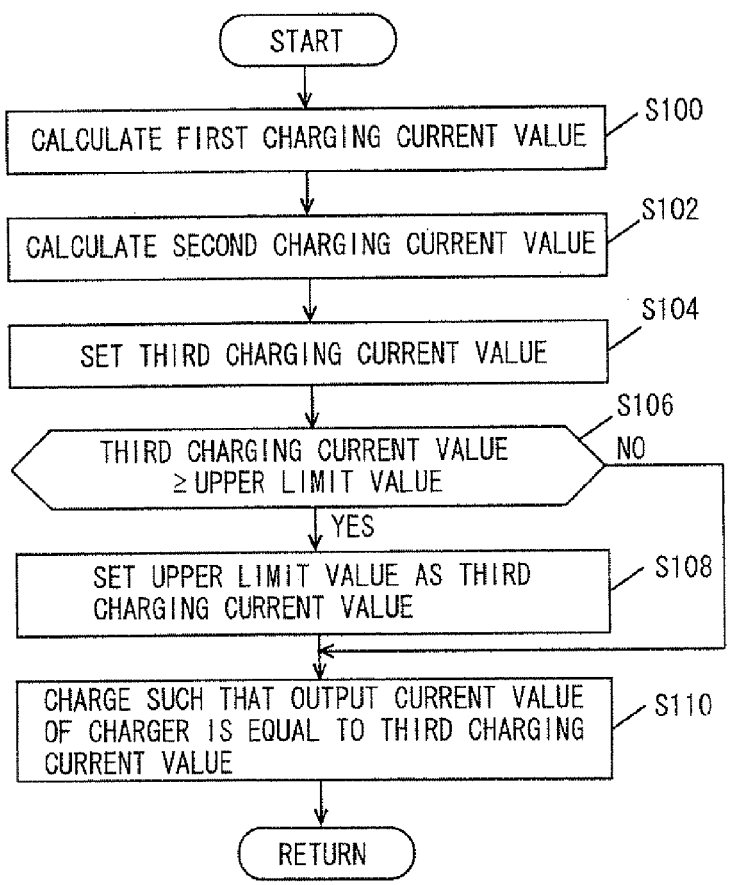
FIG. 6 is a flowchart illustrating a control structure of a program executed by the ECU according to the first embodiment of the present invention.

Referring to FIG. 6, the control structure of the program executed by ECU 1000 in the present embodiment will then be described. The program described below is repeatedly executed in a predetermined cycle during the charging. The program executed by ECU 1000 may be recorded on a recording medium such as a CD (Compact Disc), a DVD (Digital Versatile Disc) and the like and introduced into the market.

In step (hereafter abbreviated as S) 100, ECU 1000 calculates the first charging current value in accordance with the state of the battery pack. In S102, ECU 1000 calculates the second charging current value based on the information on each of charging cable 700 and external power supply 800.

In S104, ECU 1000 sets the smaller one of the first charging current value and the second charging current value as the third charging current value.

In S106, ECU 1000 determines whether the third charging current value is greater than or equal to the upper limit value. If the third charging current value is greater than or equal to the upper limit value (YES in S106), the process proceeds to S108. If not (NO in S106), the process proceeds to S110.

In S108, ECU 1000 sets the upper limit value as the third charging current value. In S110, ECU 1000 controls charger 600 such that the output current value of charger 600 is equal to the third charging current value, for charging the battery pack. Then, the process returns to S100.

The operation of ECU 1000 according to the present embodiment based on the above-described structures and flowcharts will then be described.

When the battery pack is charged, the first charging current value is calculated in accordance with the state of the battery pack (S100). Furthermore, the second charging current value is calculated based on the information on charging cable 700 and external power supply 800 (S102).

The smaller one of the calculated first and second charging current values is set as the third charging current value (S104). If the third charging current value is greater than or equal to the upper limit value (YES in S106), the upper limit value is set as the third charging current value (S108).

When the third charging current value is set, charger 600 is controlled such that the output current value of charger 600 is equal to the third charging current value, and then the battery pack is charged (S110).

As described above, in the hybrid vehicle according to the present embodiment, the first charging current value is calculated in accordance with the state of the battery pack. The second charging current value is calculated based on the information on the charging cable which connects the hybrid vehicle and the external power supply, particularly, the current capacity obtained from pilot signal CPLT. The smaller one of the calculated first and second charging current values is set as the third charging current value. The charger is controlled such that the output current value of the charger is equal to the third charging current value. This allows the output current value of the charger to be set in consideration of the current capacity of the charging cable, that is, the value of the current that can be supplied by the charging cable in addition to the state of the battery pack. Accordingly, the value of the current supplied through the charging cable can be prevented from exceeding the current capacity of the charging cable. Consequently, the battery pack can be normally charged. Furthermore, in the case where the current that can be supplied by the external power supply is limited by the breaker and the like, the breaker can be prevented from tripping.

Second Embodiment

The second embodiment of the present invention will be hereinafter described. The present embodiment is different from the above-described first embodiment in that the third charging current value is limited to the lower limit value or more. Other configurations are the same as those in the above-described first embodiment, and therefore, detailed description thereof will not be repeated.

Referring to FIG. 7, the functions of ECU 1000 according to the present embodiment will then be described. It is to be noted that the same functions as those in the above-described first embodiment are designated by the same reference characters, and therefore, detailed description thereof will not be repeated.

In addition to first calculation unit 1101, second calculation unit 1102, setting unit 1104, upper limit unit 1106, and charging unit 1108, ECU 1000 further includes a lower limit unit 1200.

Lower limit unit 1200 limits the third charging current value to a predetermined lower limit value or more. In other words, in the case where the third charging current value set by setting unit 1104 is less than or equal to the lower limit value, the lower limit value is set as the third charging current value. The lower limit value is, for example, "0" A. The lower limit value is not limited thereto.

Figure 8:
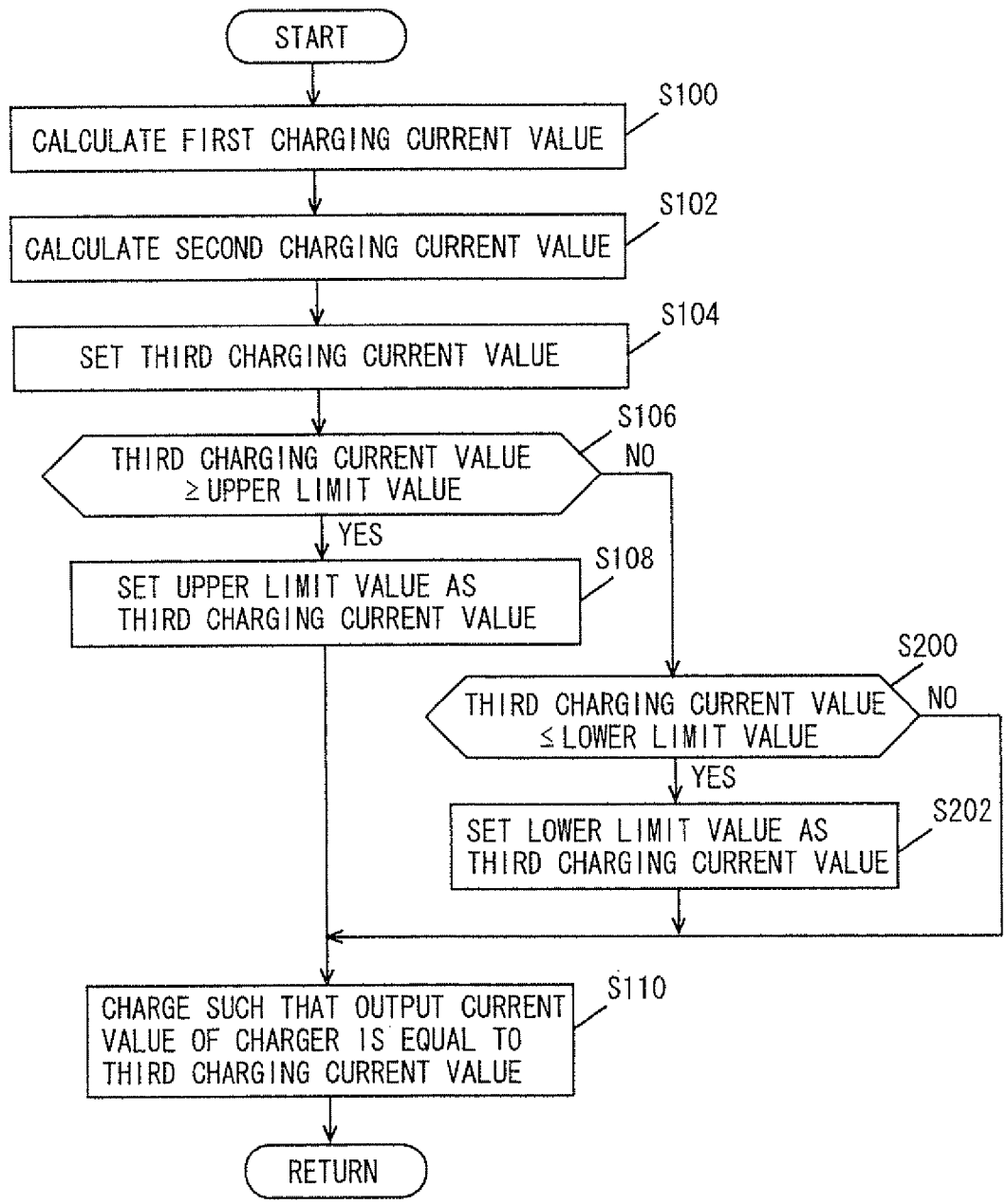
FIG. 8 is a flowchart illustrating the control structure of the program executed by the ECU according to the second embodiment of the present invention.

Referring to FIG. 8, the control structure of the program executed by ECU 1000 according to the present embodiment will then be described. The program described below is repeatedly executed in a predetermined cycle during the charging. Furthermore, the same processes as those in the above-described first embodiment are designated by the same step numbers, and therefore, detailed description thereof will not be repeated.

In S200, ECU 1000 determines whether the third charging current value is less than or equal to the lower limit value. If the third charging current value is less than or equal to the lower limit value (YES in S200), the process proceeds to S202. If not (NO in S202), the process proceeds to S110. In S202, ECU 1000 sets the lower limit value as the third charging current value.

In this way, the output current value of charger 600 can be set to the lower limit value or more. Accordingly, if the lower limit value is greater than or equal to 0, the output current value of charger 600 can be set to "0A" or more. In other words, the value of the current supplied through charging cable 700 can be set to "0A" or more. Consequently, the battery pack can be prevented from being accidentally discharged.

Third Embodiment

The third embodiment of the present invention will be hereinafter described. The present embodiment is different from the above-described first embodiment in that the third charging current value is corrected. Other configurations are the same as those in the above-described first embodiment, and therefore, detailed description thereof will not be repeated.

Figure 9:
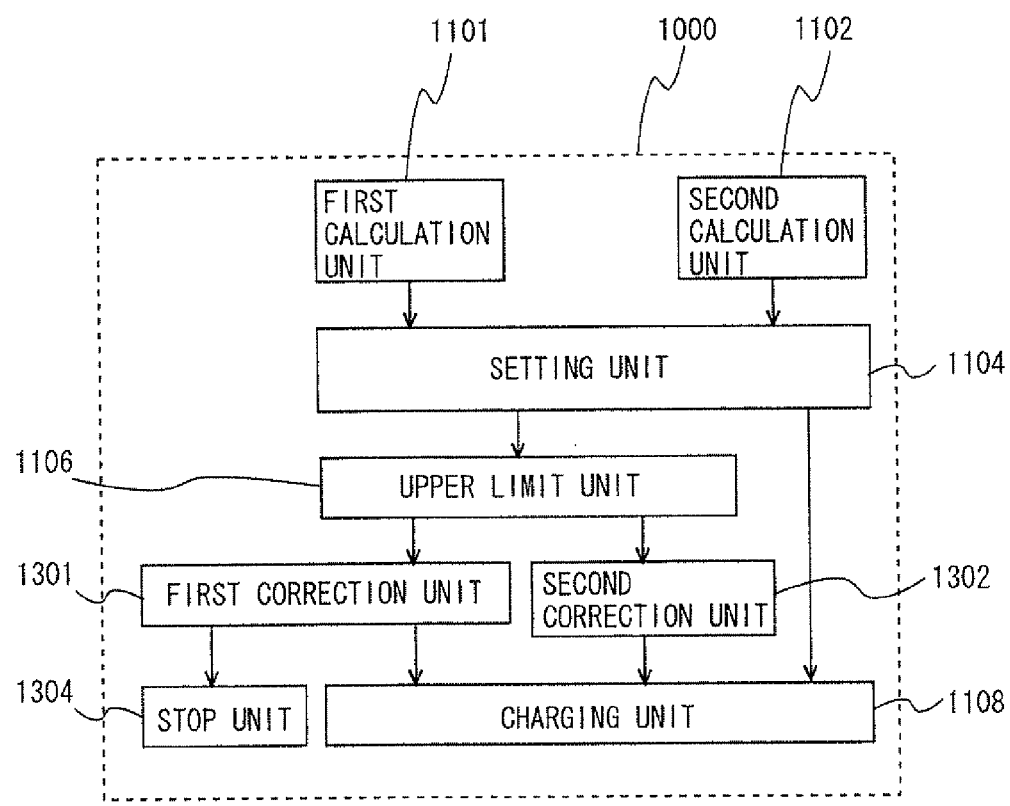
FIG. 9 is a functional block diagram of the ECU according to a third embodiment of the present invention.

Referring to FIG. 9, the functions of ECU 1000 according to the present embodiment will then be described. It is to be noted that the same functions as those in the above-described first embodiment are designated by the same reference characters, and therefore, detailed description thereof will not be repeated.

In addition to first calculation unit 1101, second calculation unit 1102, setting unit 1104, upper limit unit 1106, and charging unit 1108, ECU 1000 includes a first correction unit 1301, a second correction unit 1302 and a stop unit 1304.

First correction unit 1301 corrects the third charging current value to be decreased, More specifically, if the state where the value of the current supplied from power supply 800, that is, the value of the current output from charger 600 is greater than the current capacity of charging cable 700 continues for a predetermined first time period or more, the third charging current value is corrected to be decreased. The third charging current value is decreased by a constant decreased amount for each process. The value of the current output from charger 600 is detected by current sensor 1023.

Furthermore, if the state where the voltage detected by voltage sensor 602, that is, the voltage of power supply 800 detected within the hybrid vehicle, is less than or equal to a predetermined voltage continues for a predetermined second time period or more, the third charging current value is corrected to be decreased.

If the value of the current supplied from power supply 800, that is, the value of the current output from charger 600, is less than the current capacity of charging cable 700, second correction unit 1302 corrects the third charging current value to be increased.

More specifically, if the state where the value obtained by subtracting the value of the current supplied from power supply 800 from the current capacity of charging cable 700 is greater than or equal to a threshold value $\Delta A$ ($\Delta A>0$) continues for a predetermined third time period or more, the third charging current value is corrected to be increased. The third charging current value is increased by a constant increased amount for each process.

If the total correction amount (decreased amount) in the case where the third charging current value is corrected to be decreased is greater than the threshold value, stop unit 1304 stops the charging of the battery pack. For example, if the total correction amount in the case where the third charging current value is corrected to be decreased is greater than the initial value of the third charging current value, the charging is stopped.

Figure 10:
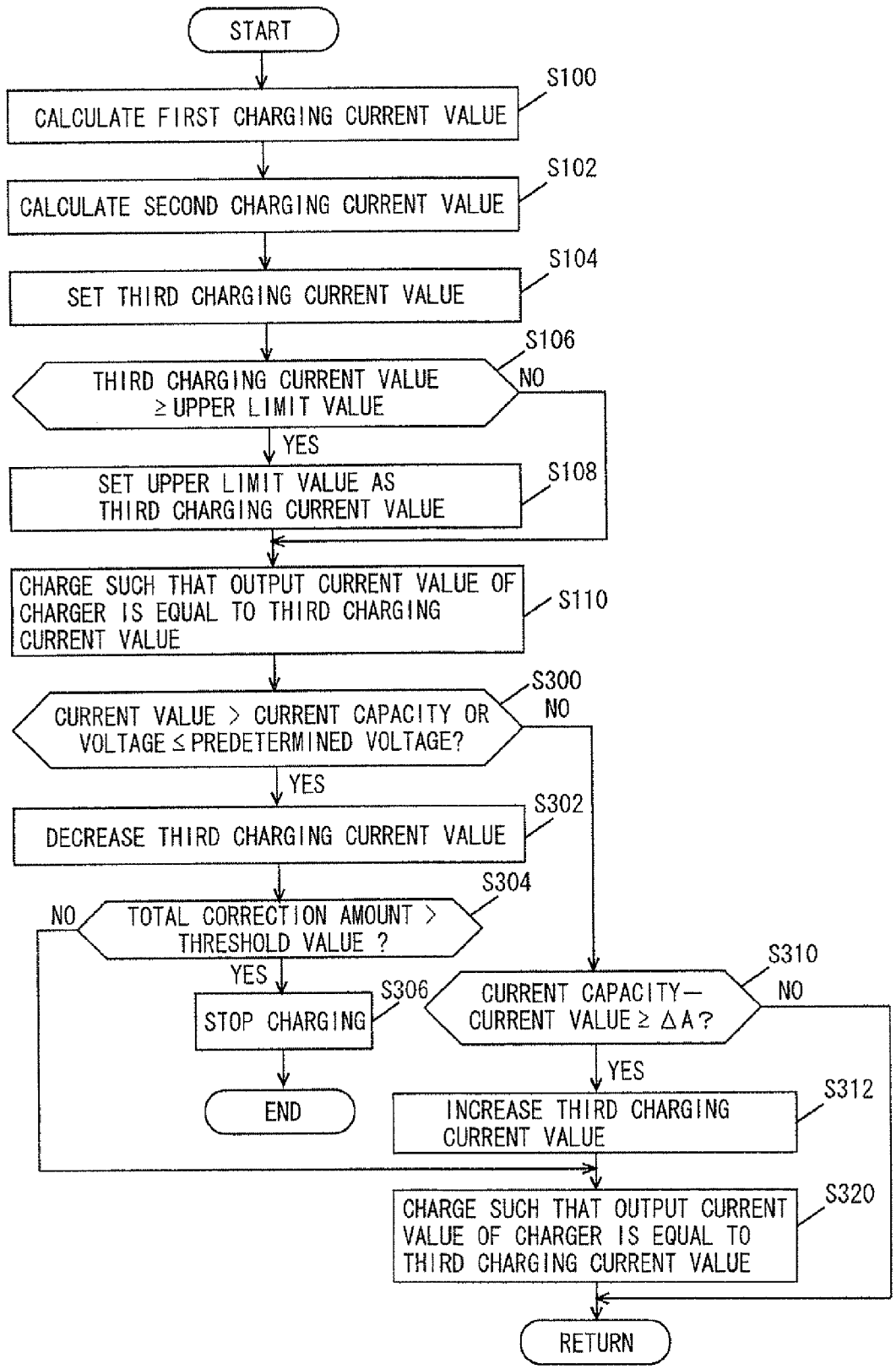
FIG. 10 is a flowchart illustrating the control structure of the program executed by the ECU according to the third embodiment of the present invention.

Referring to FIG. 10, the control structure of the program executed by ECU 1000 according to the present embodiment will then be described. The program described below is repeatedly executed in a predetermined cycle during the charging. Furthermore, the same processes as those in the above-described first embodiment are designated by the same step numbers, and therefore, detailed description thereof will not be repeated.

In S300, ECU 1000 determines whether the state where the value of the current supplied from power supply 800, that is, the value of the current output from charger 600, is greater than the current capacity of charging cable 700 continues for the predetermined first time period or more, or whether the state where the voltage of power supply 800 detected within the hybrid vehicle is less than or equal to a predetermined voltage continues for the predetermined second time period or more.

If the state where the value of the current supplied from power supply 800 is greater than the current capacity of charging cable 700 continues for the first time period or more, or the state where the voltage of power supply 800 detected within the hybrid vehicle is less than or equal to the predetermined voltage continues for the second time period or more (YES in S300), the process proceeds to S302. If not (NO in S300), the process proceeds to S310. In S302, ECU 1000 decreases the third charging current value by a constant decreased amount.

In S304, ECU 1000 determines whether the total correction amount in the case where the third charging current value is corrected to be decreased is greater than the threshold value. If the total correction amount is greater than the threshold value (YES in S304), the process proceeds to S306. If not (NO in S304), the process proceeds to S320.

In S306, ECU 1000 stops the charging of the battery pack. In this case, the third charging current value is set to "0A". In other words, the initial value of the third charging current value is set as a total correction amount. Then, this process ends.

In S310, ECU 1000 determines whether the state where the value obtained by subtracting the value of the current supplied from power supply 800 from the current capacity of charging cable 700 is greater than or equal to threshold value $\Delta A$ continues for the third time period or more.

If the state where the value obtained by subtracting the value of the current supplied from power supply 800 from the current capacity of charging cable 700 is greater than or equal to threshold value ΔA continues for the third time period or more (YES in S310), the process proceeds to S312. If not (NO in S310), the process returns to S100.

In S312, ECU 1000 increases the third charging current value by a constant increased amount. In S320, ECU 1000 controls charger 600 such that the output current value of charger 600 is equal to the third charging current value, for charging the battery pack.

The operation of ECU 1000 according to the present embodiment based on the above-described structures and flowcharts will then be described.

If the value of the current supplied from power supply 800 is greater than the current capacity of charging cable 700 during charging of the battery pack by external power supply 800, it can be said that the charging current value is relatively great with respect to the capacity of charging cable 700. Furthermore, in the case where the voltage of power supply 800 detected within the hybrid vehicle is less than or equal to the predetermined voltage, there may be some fault.

Thus, if the state where the value of the current supplied from power supply 800 is greater than the current capacity of charging cable 700 continues for the first time period or more (YES in S300), the third charging current value is decreased by a constant decreased amount (S302).

Furthermore, if the state where the voltage of power supply 800 detected within the hybrid vehicle is less than or equal to the predetermined voltage continues for the second time period or more (YES in S300), the third charging current value is decreased by a constant decreased amount (S302).

While the total correction amount in the case where the third charging current value is corrected to be decreased is less than the threshold value (NO in S304), charger 600 is controlled such that the output current value of charger 600 is equal to the third charging current value, for charging the battery pack (S320). Consequently, the value of the current in each of charging cable 700 and the electrical system can be set within the normal range.

If the total correction amount in the case where the third charging current value is corrected to be decreased is greater than the threshold value (YES in S304), the charging current value of the battery pack may be excessively decreased. For example, the charging current value of the battery pack may be a negative value and the battery pack may be discharged, at which the charging of the battery pack is stopped (S306). Consequently, the battery pack can be prevented from being accidentally discharged.

In contrast, in the case where the value obtained by subtracting the value of the current supplied from power supply 800 from the current capacity of charging cable 700 is greater than or equal to threshold value ΔA, it can be said that the value of the current supplied from power supply 800, that is, the charging current value of the battery pack, is relatively small with respect to the current capacity of charging cable 700. In this case, it takes time to complete the charging.

If the state where the value obtained by subtracting the value of the current supplied from power supply 800 from the current capacity of charging cable 700 is greater than or equal to threshold value ΔA continues for the third time period or more (YES in S310), the third charging current value is increased by a constant increased amount (S312). Charger 600 is controlled such that the output current value of charger 600 is equal to the third charging current value, and the battery pack is then charged (S320), Accordingly, the charging current value of the battery pack can be prevented from being excessively decreased.

As described above, in the hybrid vehicle according to the present embodiment, the third charging current value is corrected. The charger is controlled such that the output current value of the charger is equal to the third charging current value, and the battery pack is then charged. Accordingly, the output current value of the charger can be precisely set.

Fourth Embodiment

The fourth embodiment of the present invention will be hereinafter described. The present embodiment is different from the above-described first embodiment in that, during reset of the SOC of the battery pack, when the sum of the SOC of first battery pack 510 and the SOC of second battery pack 520 is greater than or equal to the threshold value, charger 600 is controlled such that the output current value of charger 600 is equal to a predetermined constant charging current value. Other configurations are the same as those in the above-described first embodiment, and therefore, detailed description thereof will not be repeated.

Figure 11:
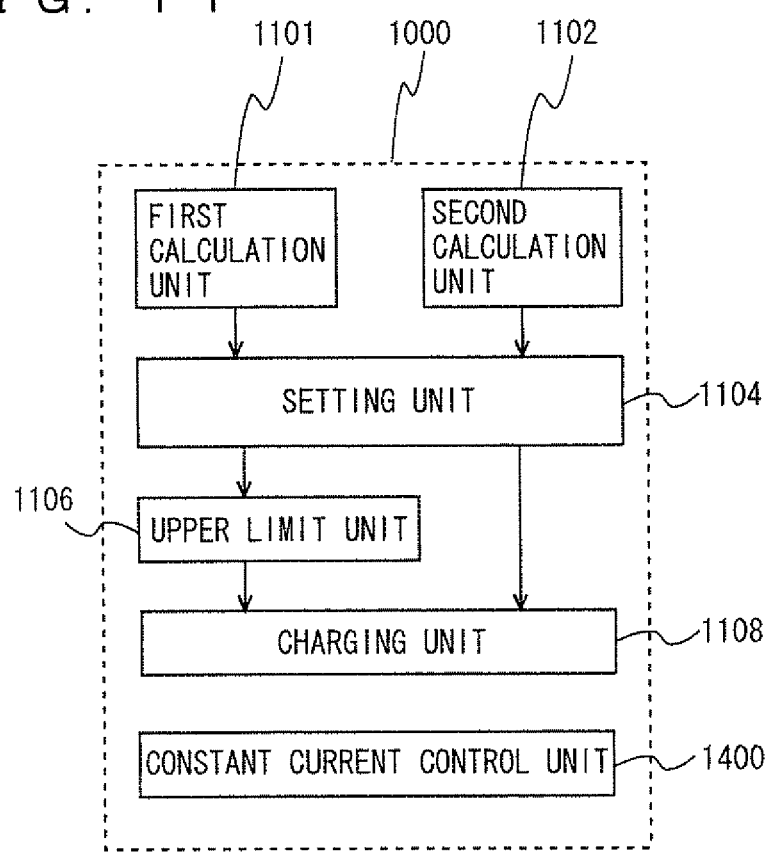
FIG. 11 is a functional block diagram of the ECU according to a fourth embodiment of the present invention.

Referring to FIG. 11, the functions of ECU 1000 according to the present embodiment will be hereinafter described. It is to be noted that the same functions as those in the above-described first embodiment are designated by the same reference characters, and therefore, detailed description thereof will not be repeated.

In addition to first calculation unit 1101, second calculation unit 1102, setting unit 1104, upper limit unit 1106, and charging unit 1108, ECU 1000 includes a constant current control unit 1400.

During reset of the SOC of the battery pack, when the sum of the SOC of first battery pack 510 and the SOC of second battery pack 520 is greater than or equal to the threshold value, constant current control unit 1400 controls charger 600 such that the output current value of charger 600 is equal to a predetermined constant charging current value (for example, 0.5A).

The threshold value is, for example, 77% of the maximum power storage amount of first battery pack 510 or second battery pack 520. It is desirable to set the threshold value based on the smaller one of the maximum power storage amount of first battery pack 510 and the maximum power storage amount of second battery pack 520. In the case where first battery pack 510 and second battery pack 520 have the same maximum power storage amount, the threshold value may be set based on either of the maximum power storage amounts. The threshold value is not limited thereto.

As the output current value of charger 600 is kept constant, the sum of the SOC of first battery pack 510 and the SOC of second battery pack 520 can be prevented from exceeding the maximum power storage amount of first battery pack 510 or second battery pack 520 (preferably, 80% of the maximum power storage amount) during reset of the SOCs of the battery packs.

The reason why the sum of the SOCs is prevented from exceeding the maximum power storage amount is because all the electric power discharged from one of the battery packs during reset of the SOCs should be supplied to the other of the battery packs.

Figure 12:
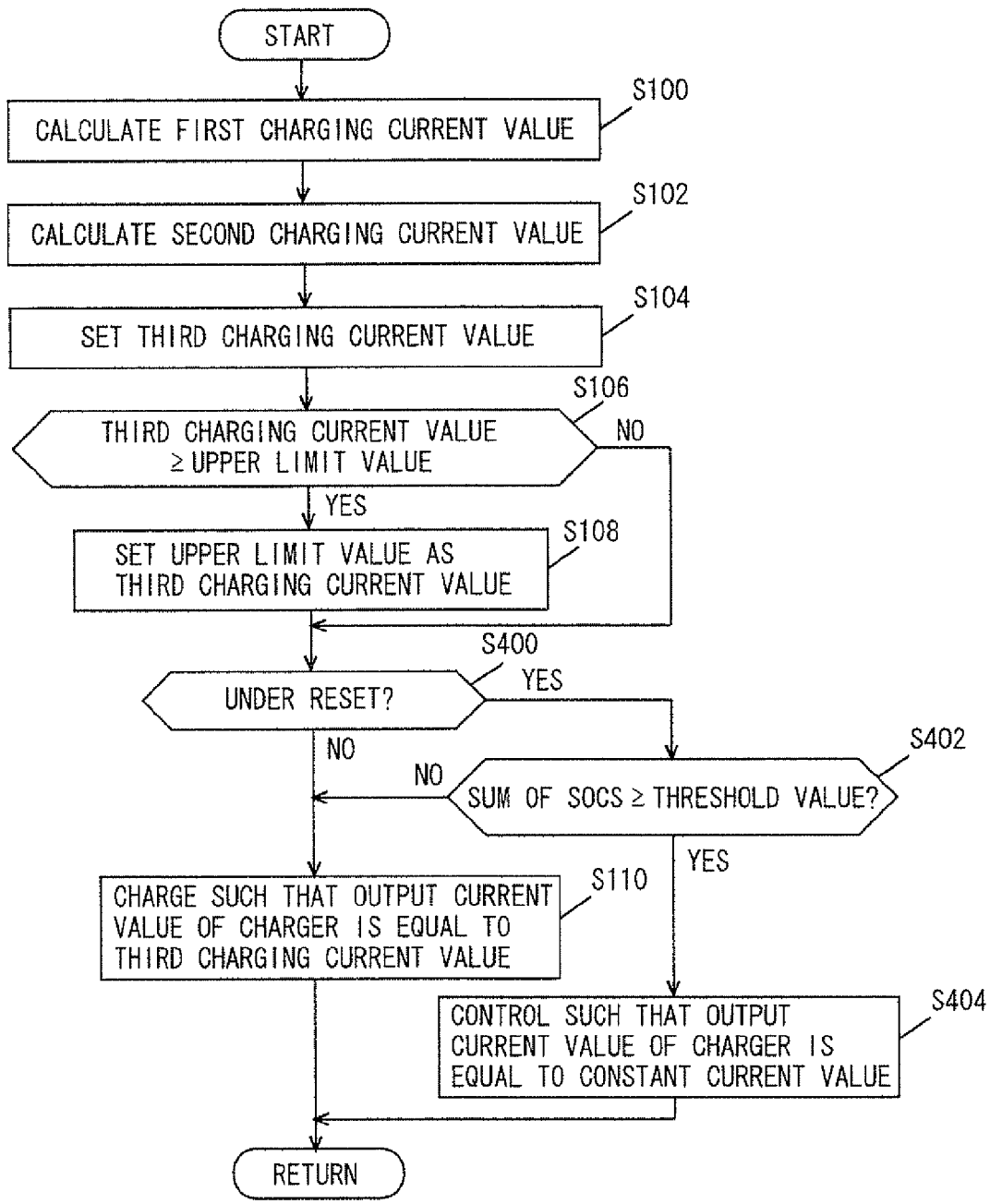
FIG. 12 is a flowchart illustrating the control structure of the program executed by the ECU according to a fifth embodiment of the present invention.

Referring to FIG. 12, the control structure of the program executed by ECU 1000 according to the present embodiment will then be described. The program described below is repeatedly executed in a predetermined cycle during the charging. Furthermore, the same processes as those in the above-described first embodiment are designated by the same step numbers, and therefore, detailed description thereof will not be repeated.

In S400, ECU 1000 determines whether the SOC of the battery pack is being reset. Since ECU 1000 itself determines whether the reset is performed or not, it is determined within ECU 1000 whether the SOC is being reset. If it is determined that the SOC is being reset (YES in S400), the process proceeds to S402. If not (NO in S400), the process proceeds to S110.

In S402, ECU 1000 determines whether the sum of the SOC of first battery pack 510 and the SOC of second battery pack 520 is greater than or equal to the threshold value. If the sum of the SOCs is greater than or equal to the threshold value (YES in S402), the process proceeds to S404. If not (NO in S402), the process proceeds to S110.

In S404, ECU 1000 controls charger 600 such that the output current value of charger 600 is equal to a predetermined constant charging current value. Then, the process returns to S100.

The operation of ECU 1000 according to the present embodiment based on the above-described structures and flowcharts will then be described.

As shown in FIG. 3 described above, during reset of the SOC of the battery pack (YES in S400), the electric power discharged from second battery pack 520 is supplied to first battery pack 510. After second battery pack 520 is discharged until the SOC of second battery pack 520 is decreased to the reset value, the electric power discharged from first battery pack 510 is supplied to second battery pack 520.

Therefore, when the sum of the SOC of first battery pack 510 and the SOC of second battery pack 520 is excessively large, there may be a case where the electric power discharged from one of the battery packs cannot be supplied to the other of the battery packs.

Thus, if the sum of the SOC of first battery pack 510 and the SOC of second battery pack 520 is greater than or equal to a threshold value (YES in S402), charger 600 is controlled such that the output current value of charger 600 is equal to a predetermined constant charging current value (S404).

Accordingly, the electric power supplied from charger 600 to first battery pack 510 or second battery pack 520 during reset of the SOC can be limited. Therefore, the sum of the SOC of first battery pack 510 and the SOC of second battery pack 520 can be prevented from exceeding the maximum power storage amount of first battery pack 510 or second battery pack 520. Consequently, it can be ensured that the electric power discharged from one of the battery packs is stored in the other of the battery packs.

As described above, in the hybrid vehicle according to the present embodiments, when the sum of the SOC of the first battery pack and the SOC of the second battery pack is greater than or equal to the threshold value, the charger is controlled such that the output current value of the charger is equal to a predetermined constant charging current value. Accordingly, the sum of the SOC of the first battery pack and the SOC of the second battery pack can be prevented from exceeding the maximum power storage amount of the first battery pack or the second battery pack. Consequently, it can be ensured that the electric power discharged from one of the battery packs is stored in the other of the battery packs.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A vehicle having a power storage mechanism that stores electric power supplied from an external power supply through a coupling unit that outputs a signal indicating a value of a current which can be supplied, said vehicle comprising:
   a charger configured to be connected to said coupling unit and to supply a current to said power storage mechanism; and
   a control unit configured to control the charger and:
      calculate a first charging current value in accordance with a state of said power storage mechanism,
      calculate a second charging current value in accordance with the value of the current which can be supplied by said coupling unit,
      calculate a third charging current value by setting a smaller one of said first charging current value and said second charging current value as said third charging current value;
      set the current to be supplied by the charger to said power storage mechanism equal to the third charging current value; and
      correct the third charging current value during charging based on said first charging current value and said second charging current value.

2. The vehicle according to claim 1, wherein said control unit is configured to limit said third charging current value to a threshold value or less.

3. The vehicle according to claim 1, wherein said control unit is configured to limit said third charging current value to a threshold value or more.

4. The vehicle according to claim 1, wherein said control unit is configured to correct said third charging current value to be decreased.

5. The vehicle according to claim 4, wherein, in a case where a value of a current supplied from said power supply is greater than the value of the current which can be supplied by said coupling unit, said control unit corrects said third charging current value to be decreased.

6. The vehicle according to claim 4, further comprising a voltage sensor that detects a voltage of said power supply within said vehicle, wherein
   in a case where the detected voltage is less than a predetermined voltage, said control unit corrects said third charging current value to be decreased.

7. The vehicle according to claim 4, wherein, in a case where an correction amount of said third charging current value is greater than a threshold value, said control unit stops charging said power storage mechanism.

8. The vehicle according to claim 1, wherein said control unit is configured to correct said third charging current value to be increased.

9. The vehicle according to claim 8, wherein, in a case where a value of a current supplied from said power supply is less than the value of the current which can be supplied by said coupling unit, said control unit corrects said third charging current value to be increased.

10. A method of charging a vehicle having a power storage mechanism that stores electric power supplied from an external power supply through a coupling unit that outputs a signal indicating a value of a current which can be supplied, said method comprising the steps of:
   calculating a first charging current value in accordance with a state of said power storage mechanism;
   calculating a second charging current value in accordance with the value of the current which can be supplied by said coupling unit;

calculating a third charging current value by setting a smaller one of said first charging current value and said second charging current value as said third charging current value;

setting the current to be supplied by the charger to said power storage mechanism equal to the third charging current value; and correcting the third charging current value during charging based on said first charging current value and said second charging current value.

11. The method of charging a vehicle according to claim 10, further comprising the step of limiting said third charging current value to a threshold value or less.

12. The method of charging a vehicle according to claim 10, further comprising the step of limiting said third charging current value to a threshold value or more.

13. The method of charging a vehicle according to claim 10, wherein said step of correcting said third charging current value includes the step of correcting said third charging current value to be decreased.

14. The method of charging a vehicle according to claim 13, wherein said step of correcting said third charging current value to be decreased includes the step of, in a case where a value of a current supplied from said power supply is greater than the value of the current which can be supplied by said coupling unit, correcting said third charging current value to be decreased.

15. The method of charging a vehicle according to claim 13, further comprising the step of detecting a voltage of said power supply, wherein said step of correcting said third charging current value to be decreased includes the step of, in a case where the detected voltage is less than a predetermined voltage, correcting said third charging current value to be decreased.

16. The method of charging a vehicle according to claim 13, further comprising the step of, in a case where a correction amount of said third charging current value is greater than a threshold value, stopping charging said power storage mechanism.

17. The method of charging a vehicle according to claim 10, wherein said step of correcting said third charging current value includes the step of correcting said third charging current value to be increased.

18. The method of charging a vehicle according to claim 17, wherein said step of correcting said third charging current value to be increased includes the step of, in a case where a value of a current supplied from said power supply is less than the value of the current which can be supplied by said coupling unit, correcting said third charging current value to be increased.

19. A vehicle having a power storage mechanism that stores electric power supplied from an external power supply through a coupling unit that outputs a signal indicating a value of a current which can be supplied, said vehicle comprising:

a charger that is configured to be connected to said coupling unit to supply a current to said power storage mechanism;

means for calculating a first charging current value in accordance with a state of said power storage mechanism;

means for calculating a second charging current value in accordance with the value of the current which can be supplied by said coupling unit;

means for calculating a third charging current value by setting a smaller one of said first charging current value and said second charging current value as said third charging current value;

means for setting the current to be supplied by the charger to said power storage mechanism equal to the third charging current value; and means for correcting the third charging current value during charging based on said first charging current value and said second charging current value.

20. The vehicle according to claim 19, further comprising means for limiting said third charging current value to a threshold value or less.

21. The vehicle according to claim 19, further comprising means for limiting said third charging current value to a threshold value or more.

22. The vehicle according to claim 19, wherein said correction means includes means for correcting said third charging current value to be decreased.

23. The vehicle according to claim 22, wherein said correction means includes means for correcting said third charging current value to be decreased, in a case where a value of a current supplied from said power supply is greater than the value of the current which can be supplied by said coupling unit.

24. The vehicle according to claim 22, further comprising means for detecting a voltage of said power supply within said vehicle, wherein said correction means includes means for correcting said third charging current value to be decreased, in a case where the detected voltage is less than a predetermined voltage.

25. The vehicle according to claim 22, further comprising means for stopping charging said power storage mechanism, in a case where a correction amount of said third charging current value is greater than a threshold value.

26. The vehicle according to claim 19, wherein said correction means includes means for correcting said third charging current value to be increased.

27. The vehicle according to claim 26, wherein said correction means includes means for correcting said third charging current value to be increased, in a case where a value of a current supplied from said power supply is less than the value of the current which can be supplied by said coupling unit.

* * * * *